(12) United States Patent
Ritter

(10) Patent No.: US 6,296,276 B1
(45) Date of Patent: Oct. 2, 2001

(54) GAS BAG

(75) Inventor: Philipp Ritter, Wallertheim (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/652,538

(22) Filed: Aug. 31, 2000

(30) Foreign Application Priority Data

Sep. 1, 1999 (DE) .......................................... 299 15 364 U

(51) Int. Cl.$^7$ ................................................. B60R 21/16
(52) U.S. Cl. .................................... 280/743.2; 280/728.1
(58) Field of Search ............................ 280/728.1, 743.1, 280/743.2

(56) References Cited

U.S. PATENT DOCUMENTS

| 5,464,250 | | 11/1995 | Sato . | |
|---|---|---|---|---|
| 5,566,977 | * | 10/1996 | Wipasuramonton | 280/743.1 |
| 5,651,395 | * | 7/1997 | Graham et al. | 139/390 |
| 5,685,347 | * | 11/1997 | Graham et al. | 139/390 |
| 6,000,442 | * | 12/1999 | Busgen | 139/389 |
| 6,113,141 | * | 9/2000 | Baker | 280/743.2 |
| 6,152,481 | * | 11/2000 | Webber et al. | 280/730.2 |
| 6,168,191 | * | 1/2001 | Webber et al. | 280/730.2 |

FOREIGN PATENT DOCUMENTS

| 3903216 | 8/1990 | (DE) . |
|---|---|---|
| 4324487 | 1/1995 | (DE) . |

* cited by examiner

Primary Examiner—Eric Culbreth
Assistant Examiner—L. Lum
(74) Attorney, Agent, or Firm—Tarolli, Sundheim, Covell, Tummino & Szabo L.L.P.

(57) ABSTRACT

The invention relates to a gas bag having at least one chamber. The gas bag comprises at least two fabric layers arranged opposite one another and delimiting the at least one chamber which can be filled with gas. The fabric layers each form a surface area and consist of threads which comprise warp and weft threads. The gas bag further comprises at least one spacer which is joined to the fabric layers and, in an inflated state of the gas bag, limits a distance between the fabric layers. The spacer is made up of some of the threads which, related to the inflated state of the gas bag, depart from the surface area formed by their associated fabric layer and extend towards the opposite fabric layer to be joined to threads of the opposite fabric layer.

19 Claims, 4 Drawing Sheets

GAS BAG

TECHNICAL FIELD

The invention relates to a gas bag.

BACKGROUND OF THE INVENTION

A gas bag known from U.S. Pat. No. 5,464,250 has a zigzag-shaped section of fabric, sewn at the edge sections with the fabric layers, which section acts as a spacer. The effect of this spacer is to prevent the gas bag from bulging excessively, i.e. from becoming too thick between its edges. Other types of spacers are so-called tethers, the ends of which are sewn to the fabric layers and limit the spacing locally. The fitting of spacers is a very expensive and elaborate procedure and hinders inversion of the gas bag after sewing. The arrangement of the spacers is therefore very complicated, and for manufacturing reasons the spacers cannot be arranged at any site whatever. On the other hand, the inflated gas bags would become unnecessarily thick without spacers, which presents problems. Optimum restraint calls to some extent for no extreme thickness of the gas bag, so that an unnecessarily large amount of gas would be needed to completely fill the gas bag. Moreover, as the thickness becomes greater, the risk of the occupants being struck by the deploying gas bag also increases.

For this reason, side gas bags (known as "window bags") are produced that have numerous, parallel, narrow chambers. Here, the fabric layers are interwoven in one piece on the outside contour of the gas bag and between the chambers. The numerous chambers, in some cases elongated and having a low cross-section, can increase the time to inflate the gas bag. Furthermore, these require precise delivery of the gas to the chambers themselves, e.g. by means of a gas lance which extends along the roof frame.

BRIEF SUMMARY OF THE INVENTION

The invention relates to a gas bag which has at least one chamber and which is distinguished by spacers that can be manufactured with extreme ease and at low costs, at the same time the spacers having less influence on the flow within the gas bag than those previously known. Furthermore, the gas bag proposed is distinguished by the possibility of having spacers at any sites and in any number without making the manufacture of the gas bag significantly more expensive or more difficult. This is accomplished with a gas bag which comprises at least two fabric layers arranged opposite one another and delimiting the at least one chamber which can be filled with gas. The fabric layers each form or define a surface area and consist of threads which comprise warp and weft threads. The gas bag further comprises at least one spacer which is joined to the fabric layers and, in an inflated state of the gas bag, limits a distance between the fabric layers. The spacer is made up of some of the threads which, related to the inflated state of the gas bag, depart from the surface area formed by their associated fabric layer and extend towards their opposite fabric layer to be joined to threads of the opposite fabric layer. The term "thread" used throughout the description stands for warp and/or weft threads of the gas bag fabric. In the proposed gas bag, the spacers are formed by several warp and/or weft threads which depart, so to speak, from the composite fabric and extend towards the opposite fabric layer. The spacer is, therefore, not a separate part that must be attached to the fabric layers, but an integral part of the fabric layers. The technique of partial interweaving of fabric layers permits the spacers to be positioned anywhere. Moreover, in the region where they function as spacers, the warp and/or weft threads hinder the flow of gas within the gas bag only slightly because they do not necessarily have to be designed as a sheet-like fabric in the region of the spacer. The gas can therefore flow between the individual threads and cause rapid deployment of the gas bag. Due to the inexpensive and variable technique of interweaving in one piece, the invention makes it possible for the first time to manufacture at low cost large-area gas bags that almost resemble mattresses.

The warp and/or weft threads that function as spacers can, after departing from the surface formed by the associated fabric layer (usually the outside wall of the gas bag) and after formation of the spacer, go into the opposite fabric layer and thus become an integral part of this fabric layer. Furthermore, after the spacers have been formed, they can go back into their associated fabric layer and integrate with it. However, they must then be joined to warp and/or weft threads of the opposite fabric layers in the region of the spacer. This can be accomplished, for instance, by also separating warp and/or weft threads from the composite arrangement of the opposite fabric layer and joining them between the two external walls of the gas bag to the warp and/or weft threads separated from the composite fabric of the opposite fabric layer.

In this way, spacers can be made that form an H shape, an X shape, or a Y shape when viewed in cross-section.

The warp and/or weft threads forming the spacer are missing present in the region of the spacer in the fabric layer associated with it. Consequently, the fabric layer is less gas-tight at this point. This can be used to deliberately provide the external wall of the gas bag with a specific gas permeability. If the gas permeability becomes too great, however, the fabric layer providing the warp and/or weft threads can also be coated, at least in the region where the spacer is provided. In the case of side gas bags, for instance, that should be filled completely for as long as possible, the fabric layers are coated with film, preferably on the outside. Numerous spacers can thus be provided because, due to the coating with film, it is no longer disadvantageous in terms of gas permeability for the external wall to have just a few threads in the region of the spacers. The fabric itself thus forms essentially a supporting structure only and the gas-tightness as such is provided by the film.

When the gas bag is a large-area side gas bag and has several chambers formed by interweaving into one piece the opposite fabric layers, the spacers described above are provided additionally within the chambers. Although the chambers themselves have a small cross-section, the thickness of the gas bag can be reduced once again by the spacers and be brought down to the dimension that is adequate for the purposes of restraint. The spacers can be of elongated and, for example, linear shape, i.e. form an elongated, gas-permeable wall. The spacers can, however, also be point-shaped or ring-shaped, rather like a bed mattress where knobs visible on the outer side form the end of spacers.

DETAILED DESCRIPTION OF THE PREFERRED EMBODIMENTS

Figure 1:
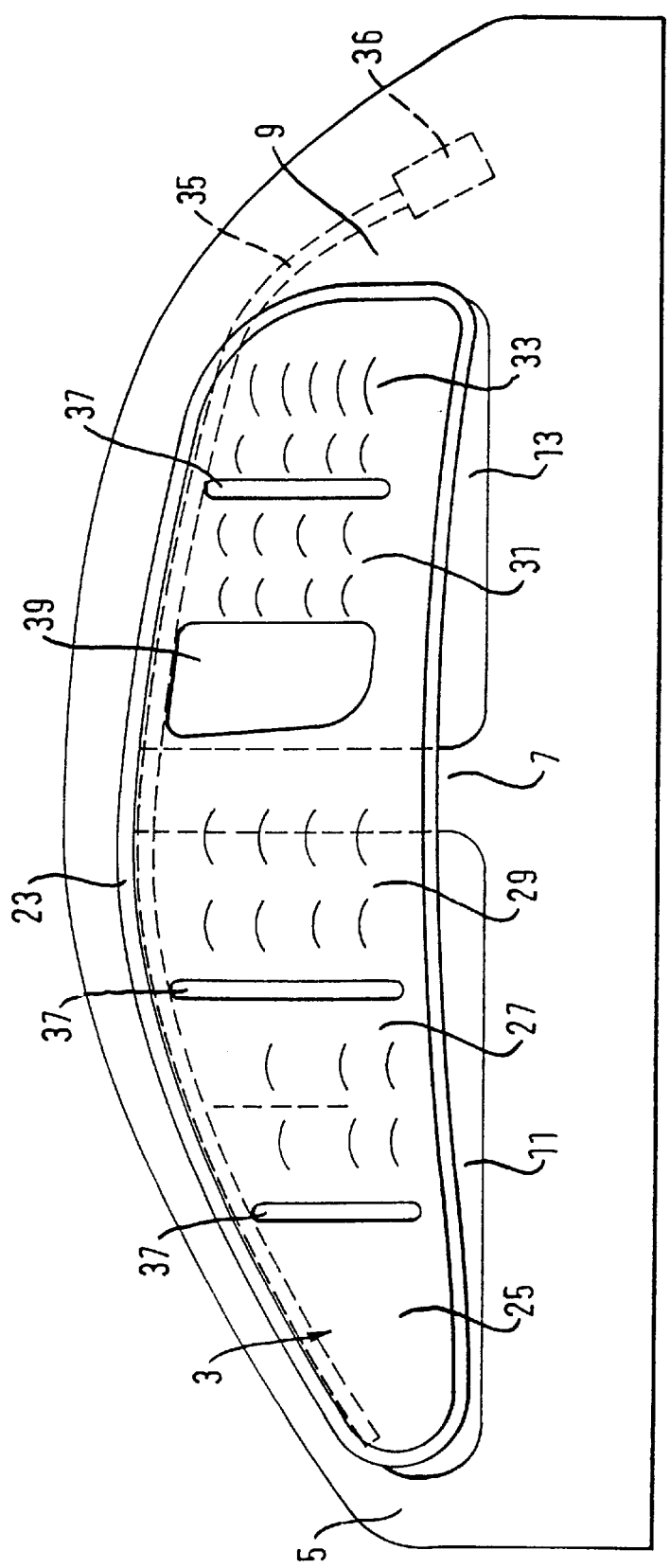
FIG. 1 shows an inflated head/side gas bag according to the invention in a first embodiment.

In FIG. 1, a head/side gas bag 3 is shown which extends in the inflated state in the vehicle from the A-pillar 5 across the B-pillar 7 through to the C-pillar 9 and completely covers the side windows 11, 13. In the inflated state, the side gas bag 3 has a large surface area and is shaped like a mattress, with nearly uniform thickness. It consists of two fabric layers 15, 17 that can be identified better in FIG. 2. The fabric layers 15, 17 form the outer walls of the gas bag. Both fabric layers 15, 17 consist of warp and weft threads 21 and 19, respectively; in FIG. 2, several warp threads 21 and one weft thread 19 are shown. The two fabric layers 15, 17 are interwoven into one piece in the region of the outside contour 23.

The gas bag consists of a plurality of chambers 25 to 33 which are connected to one another in terms of flow at the lower edge of the gas bag. A so-called gas lance 35 extends from the C-pillar 9, starting at a gas generator 37, into the interior of the gas bag and runs along the roof frame up to the A-pillar 5. Between the chambers 25 to 33, the fabric layers 15, 17 are also interwoven into one piece in the regions 37 that represent the partitions. The region 39 is interwoven over a large area; it also represents a partition and is arranged in a region that is at a considerable distance from the head of the occupant. The partitions 37 to 39 are gas-tight and therefore do not allow gas to flow from one chamber to the next.

Figure 2:
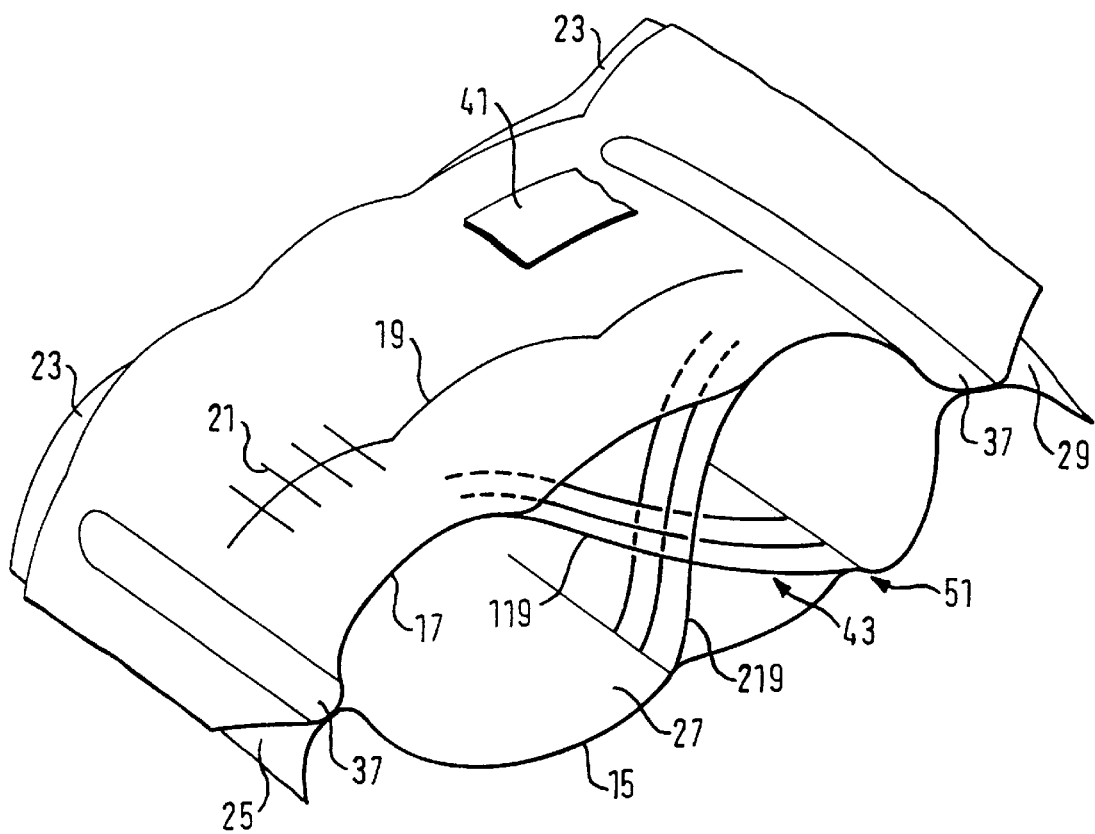
FIG. 2 shows a perspective view of a section through a single chamber of the gas bag shown in FIG. 1 in the inflated state.

The gas bag is coated on the outside of both fabric layers 15, 17 by a film 41; in FIG. 2, a small section of the film 41 is shown just by way of example. In fact, the film 41 covers the entire outside of both fabric layers 15, 17. The film 41 ensures that the gas bag 3 is gas-tight.

From FIG. 2 it is possible to see how it is accomplished that in the region of each chamber 27 to 33 the gas bag has only a small thickness and bulges outward only slightly. In each chamber there is arranged one or a plurality of spacers 43 that hold the fabric layers 15, 17 so as to keep a specific distance to each other. The spacers 43 are formed by threads of the fabric layers 15, 17 that depart from the composite fabric over a predetermined length and finally go back into the composite fabric of the original (i.e. their corresponding) fabric layer or of the opposite fabric layer. The spacers 43 are therefore integrated so as to form one piece with the fabric layers 15, 17.

In order to illustrate this, FIG. 2 shows by way of example several weft threads 119 from the upper fabric layer. These weft threads 119 are still integrated in the fabric layer 17 in the region of the arrow relating to the reference numeral 17. The fabric layer 17 defines a surface or, in other words, an outside wall of the gas bag. The weft threads 119 then depart from the composite fabric and hence the surface defined by its associated fabric layer 17 and extend at an angle toward the opposite fabric layer 15 into which they then go in the region 51. On the other hand, whilst weft threads 219 from the lower fabric layer 15 are still present in the composite fabric in the region of the reference symbol 15, they depart from the fabric layer 15 in the region of the spacer 43 and extend at an angle toward the opposite fabric layer 17 into which they then finally go. Viewed in cross-section, the weft threads 119, 219 form an "X". The weft threads 119, 219 do indeed contact each other here, but they are not joined together between the fabric layers 15, 17. Because only individual weft threads 119, 219 depart from the fabric layers 17 and 15, respectively, no partition is created but a spacer 43 which runs linearly and parallel to the partitions 37 over almost the entire height of the gas bag 3.

Instead of or in addition to the weft threads 19, warp threads 21 can also run out of the fabric layers 15, 17 and extend toward the opposite fabric layer in order to form a spacer.

Figure 3:
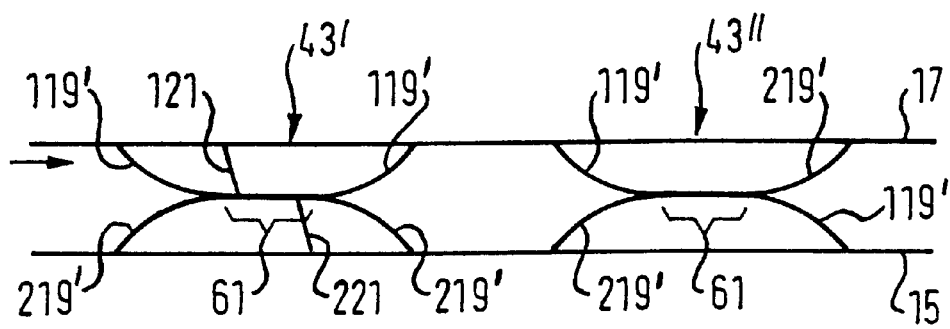
FIG. 3 shows a cross-sectional view through two other embodiments of the gas bag according to the invention, in its non-inflated state.

FIG. 3 shows two different embodiments of the spacer. In the embodiment on the left, the spacer 43' is formed by warp threads 119' departing from the fabric layer 17 (in the direction of the arrow, i.e. described from left to right) and run toward the fabric layer 15. Equally, warp threads 219' depart from the fabric layer 15 and run toward the fabric layer 17. The warp threads 119' and 219' encounter each other and are joined together in a portion 61 in that weft threads 121 from the upper fabric layer 17 and weft threads 221 from the lower fabric layer 15 extend into the portion 61 and are joined to, i.e. woven with, the warp threads 119, 219. Beyond the portion 61, the warp threads 119', 219', as well as the weft threads 121, 221, return to their associated fabric layers 17 and 15, respectively.

In the embodiment on the right in FIG. 3, the spacer 43" is formed by the warp threads 119', 219' running toward the opposite fabric layer 15 and 17 respectively, being joined together in the portion 61 and then not running back to the fabric layer associated with it but to the opposite fabric layer and going into this fabric layer. For reasons of clarity, the weft threads 121, 221 are not shown in the embodiment on the right even though they exist in order to create the portion 61.

Figure 4:
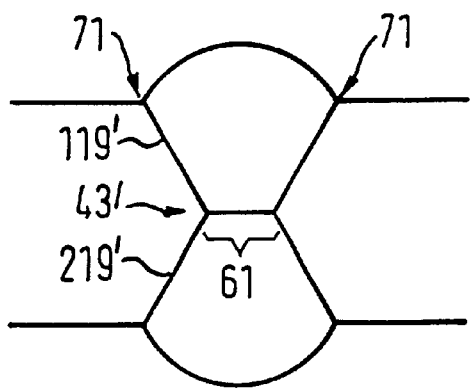
FIG. 4 shows the region of the gas bag shown in FIG. 3 in the inflated state.

In FIG. 3, the portrayed section of the gas bag is shown in the non-inflated state, but slightly pulled apart. In FIG. 4, however, the gas bag is shown in the region of the spacer 43' in the inflated state. It can be seen that in the inflated state the spacer 43' assumes an H-shape with vertical legs each of which runs at an angle to the outside towards the end of its free ends, and with a connecting leg which is formed through the portion 61. Between the attachment points 71, the gas bag bulges slightly outwards. All in all, this results in a kind of mattress shape.

Figure 5:
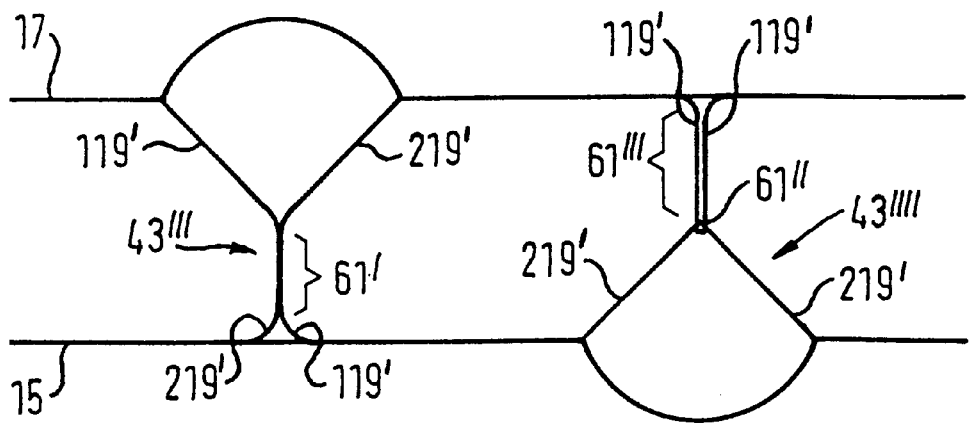
FIG. 5 shows a cross-sectional view through a gas bag in the inflated state according to a fourth and fifth embodiment.

In the embodiment shown in FIG. 5, the spacers 43''' and 43'''' have a Y-shape when viewed in cross-section. This is formed by the warp threads 119' that separate from the fabric layer 17 joining in a portion 61' (middle piece of the Y) with the separating warp threads 219'. In the V-shaped upper region of the Y, the threads run separately from each other. Finally, the warp threads 119' go into the fabric layer 15 and the warp threads 219' go into the fabric layer 17. The portion 61' is immediately adjacent to the fabric layer 15, but for the purpose of better illustration the lower end of the portion 61' is shown somewhat pulled apart.

In the embodiment on the right in FIG. 5, the spacer 43"" is formed by the warp threads 119' first running toward fabric layer 15 where they are joined in a portion 61" with the warp threads 219' from the fabric layer 15. The warp threads 119' then run back again into the fabric layer 17. In both embodiments in FIG. 5, that on the left and that on the right, there are weft threads that contribute to defining the portions 61', 61" and 61'''. In the embodiment shown on the right in FIG. 5, it must furthermore also be ensured that the length of the warp threads 119' is the same as the length of the warp threads 219 in the region where they have been separated from the composite fabric; otherwise the fabric layers would become displaced by a large amount relative to each other.

When the embodiments shown in FIG. 5 are used, it must also be ensured that the quantity of spacers 43''' or 43'''' is always an even number because in the region of the spacers there is a curvature of one fabric layer toward the outside whereas the other fabric layer has no curvature. Consequently, the wall with the curvature is also shortened in the longitudinal direction. This shortening is balanced out only with an even number of spacers.

Figure 6:
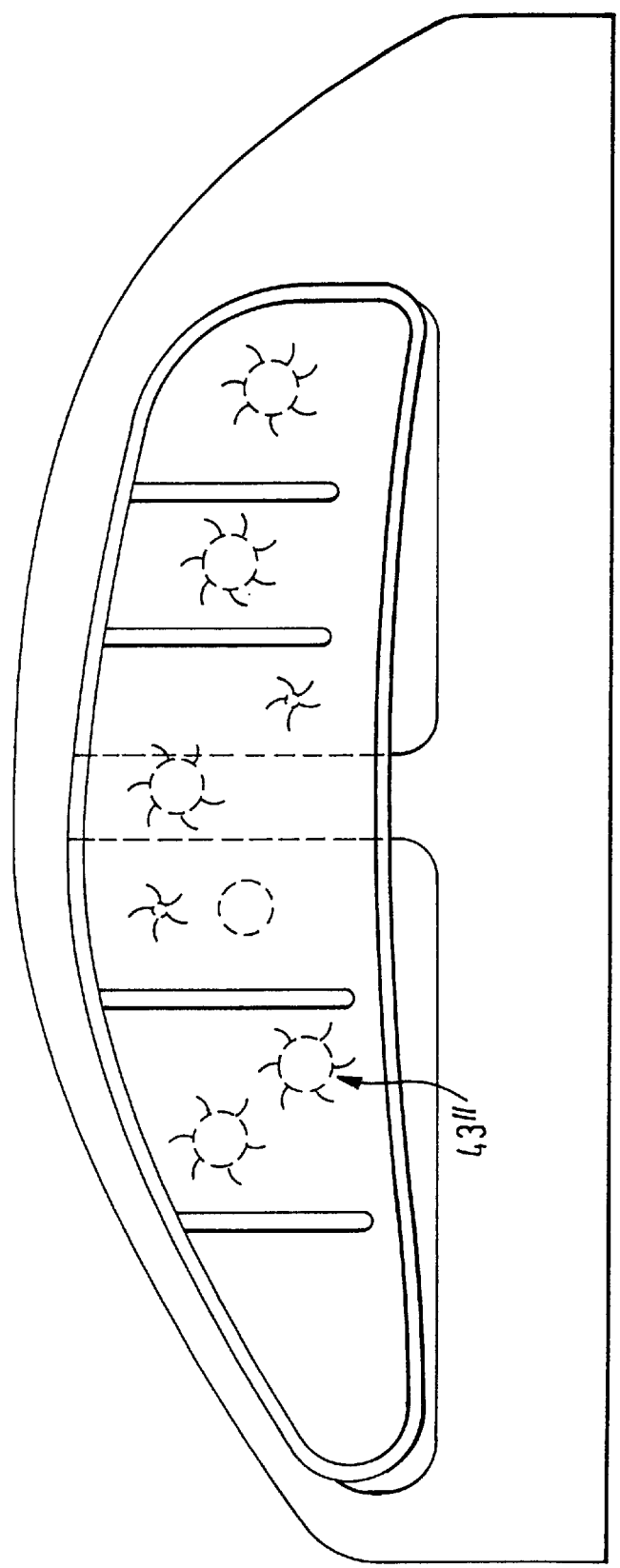
FIG. 6 shows a head/side gas bag in the inflated state according to a sixth embodiment.

FIG. 6 is intended to show that the spacers do not have to be just elongated and run linearly as in FIG. 1, but can also be of point or circular shape for instance, e.g. when the embodiments shown in FIG. 5 are designed such that the warp and weft threads separate from the composite fabric in the region of a circle.

What is claimed is:

1. A gas bag having at least one chamber, said gas bag comprising at least two fabric layers arranged opposite one another and delimiting said at least one chamber which can be filled with gas, said fabric layers each forming a surface area and consisting of threads which comprise warp and weft threads, and at least one spacer which is joined to said fabric layers and, in an inflated state of said gas bag, limits a distance between said fabric layers, said spacer being made up of some of said threads which, related to said inflated state of said gas bag, depart from said surface area formed by their associated fabric layer and extend towards the opposite fabric layer to be joined to threads of said opposite fabric layer.

2. The gas bag according to claim 1, wherein said threads functioning as said spacer depart from said surface area formed by said associated fabric layer and, after forming said spacer, go into said opposite fabric layer.

3. The gas bag according to claim 1, wherein said threads functioning as said spacer depart from said surface area formed by said associated fabric layer and, after forming said spacer, go back into said associated fabric layer.

4. The gas bag according to claim 1, wherein some of said threads of both oppositely located fabric layers depart from said surface areas formed by said associated fabric layers to run towards the corresponding opposite fabric layer and, in order to collectively form said spacer between said fabric layers, are joined together at least section-wise in a portion of said spacer.

5. The gas bag according to claim 4, wherein said joining in said portion of said spacer is effected by weaving.

6. The gas bag according to claim 4, wherein said threads forming said spacer form an H shape in said inflated state of said gas bag and viewed in cross-section.

7. The gas bag according to claim 6, wherein, in order to form said H shape, said threads forming said spacer extend towards each other from opposite fabric layers and, in order to form a connecting leg of said H shape, are interwoven in a region and finally pass on to one of their associated fabric layer and their opposite fabric layer and go into the fabric layers.

8. The gas bag according to claim 4, wherein said threads forming said spacer form an X shape in said inflated state of said gas bag and viewed in cross-section.

9. The gas bag according to claim 8, wherein, in order to form said X shape, said threads coming from opposite fabric layers and forming said spacer extend towards and pass each other and finally go into their opposite fabric layer.

10. The gas bag according to claim 4, wherein said threads forming said spacer form a Y shape in said inflated state of said gas bag and viewed in cross-section.

11. The gas bag according to claim 10, wherein a middle piece of said Y shape is formed by said threads of one fabric layer.

12. The gas bag according to claim 10, wherein said middle piece of said Y shape is formed by threads of both fabric layers, which are joined together, and said threads, in a region of said V-shaped section of said Y shape, running separately from each other.

13. The gas bag according to claim 1, wherein at least one fabric layer is coated at least in a region where said spacer is provided.

14. The gas bag according to claim 13, wherein said gas bag has an outer side and is coated by a film applied to said outer side.

15. The gas bag according to claim 1, wherein said gas bag has a plurality of chambers and said spacer is provided within at least one of said chambers.

16. The gas bag according to claim 1, wherein said gas bag is a large-area side gas bag with a plurality of chambers, and said fabric layers for forming said chambers and forming an outside contour are interwoven in one piece, and wherein said spacers are provided in at least some of said chambers.

17. The gas bag according to claim 16, wherein said spacers extend linearly over a section of said gas bag.

18. The gas bag according to claim 16, wherein said spacers are arranged in a punctiform manner.

19. The gas bag according to claim 16, wherein said spacers extend in a ring shape.

* * * * *